July 4, 1967    P. R. KURZHALS ETAL    3,329,375
ATTITUDE CONTROL AND DAMPING SYSTEM FOR SPACECRAFT
Filed Dec. 8, 1964    3 Sheets-Sheet 1

INVENTORS
PETER R. KURZHALS
RALPH W. WILL

BY
ATTORNEYS

# United States Patent Office 3,329,375
Patented July 4, 1967

3,329,375
ATTITUDE CONTROL AND DAMPING SYSTEM FOR SPACECRAFT
Peter R. Kurzhals and Ralph W. Will, Hampton, Va., assignors to the United States of America as represented by the Administrator of the National Aeronautics and Space Administration
Filed Dec. 8, 1964, Ser. No. 416,940
6 Claims. (Cl. 244—1)

The invention described herein may be manufactured and used by or for the Government of the United States of America for governmental purposes without the payment of any royalties thereon or therefor.

The invention relates generally to the control of spacecraft and more specifically concerns the utilization of momentum devices to form a reliable fine attitude control and damping system for spacecraft.

In the past, various concepts using momentum devices have been suggested for controlling the attitude of spacecraft. These have included reaction wheels, and twin single-gimballed control moment gyros. The disadvantages of these prior art devices are their inadequate pointing accuracies, their high-power consumptions, their large weights, their complexities, and their undesirable coupled response characteristics.

It is an object of this invention to utilize momentum devices to provide an optimum fine attitude control and damping system for spacecraft.

It is another object of this invention to provide a spacecraft control system that produces torques which can be applied in any desired direction without unwanted cross-coupling effects, thus allowing maximum use of available angular momentum for control.

It is still another object of this invention to provide a spacecraft control system in which power consumption and weight are minimized.

It is a further object of this invention to provide a spacecraft control system that has fine pointing accuracies.

It is still a further object of this invention to provide a control system for spacecraft in which the control command inputs to the individual momentum devices consists of direct torque or gimbal rate commands that are easy to mechanize.

It is yet another object of this invention to provide a control system for spacecraft having both nonspinning and spinning modes of operation.

The heart of the present invention is a constant rate flywheel mounted on double gimbals and will be referred to as a control moment gyro. The control torques that are produced by a control moment gyro and applied to the spacecraft are produced by the precession of its flywheel about its double gimbals. This precession is induced about either gimbal by the application of a torque to the other gimbal. Consequently, the reaction torques to the torques that are applied to the gimbals are applied to the spacecraft.

The present invention can control a spacecraft having both nonspinning and spinning modes of operation. For the nonspinning or zero-gravity mode of operation of the spacecraft, four control moment gyros are arranged in pairs with each pair constituting a twin control moment gyro. The flywheels of the two control moment gyros of a twin control moment gyro have equal and opposite momenta. They are initially alined with an axis of the spacecraft such that the torques produced by them cancel, whereby zero torque is applied to the spacecraft. This twin control moment gyro is now capable of receiving input torques and applying these torques to the two axes of the spacecraft that are perpendicular to said axis. When one of the two input control torques is applied to the twin control moment gyro, it is applied in synchronism to one pair of corresponding gimbals of both control moment gyros; and when the other input control torque is applied to the twin control moment gyro it is applied in synchronism to the other pair of corresponding gimbals of both control moment gyros. Consequently, the two flywheels will precess in synchronism and produce torques about the said two perpendicular axes of the spacecraft.

For the nonspinning mode of operation of a spacecraft, one of the twin control moment gyros is alined with the spacecraft's axis of minimum required torque and produces control torques about the spacecraft's axes of maximum and intermediate required torque. The other twin control moment gyro is alined with the spacecraft's axis of intermediate required torque and produces torques about the spacecraft's axes of maximum and minimum required torque. Consequently, both twin control moment gyros contribute control torques about the axis of maximum required torque or the axis about which the largest disturbances or most frequent maneuvers are anticipated. In this way, a maximum capability for fine attitude control is obtained for the spacecraft. For rapid maneuvers, the system may be supplemented by reaction jets.

For the artificial gravity or spinning operational mode of the spacecraft, one or more of the control moment gyros are alined with the vehicle spin axis and the remaining gyros are despun and locked in their positions. The gimbal angles for the individual control moment gyros are commanded using a rate and attitude control feedback loop. The necessary damping torques are then produced by a misalinement between the flywheel spin vector and the spacecraft spin vector.

Other objects and advantages of this invention will further become apparent hereinafter and in the drawings in which.

Figure 1:
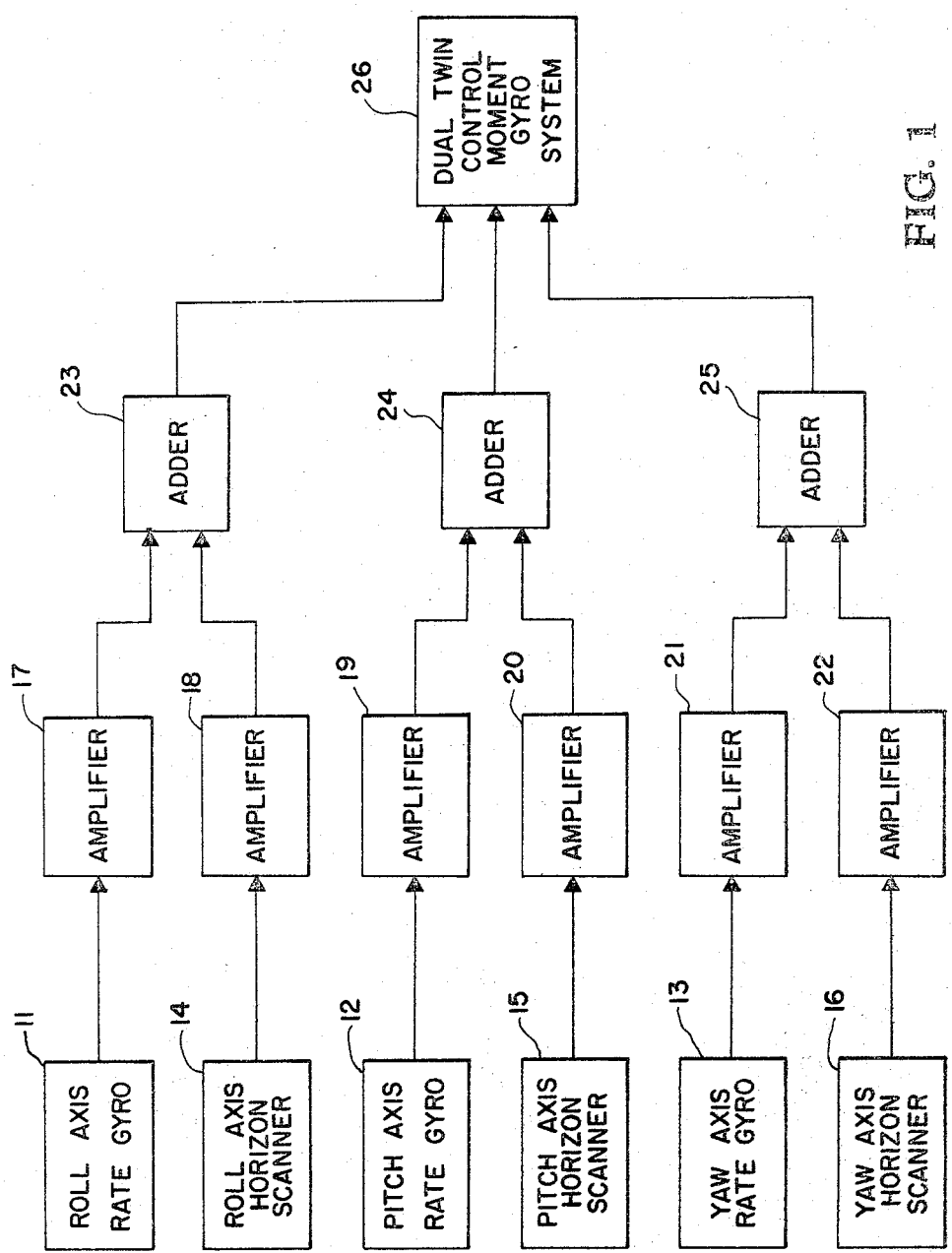
FIG. 1 is a block diagram of the invention for the nonspinning mode of operation of the spacecraft being controlled.

In describing the preferred embodiment of the invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

Turning now to the specific embodiment of the invention selected for illustration in the drawings, the numbers 11, 12 and 13 designate boxes representing rate gyros. Rate gyro 11 is placed on the spacecraft that used the present invention to produce signals proportional to the angular velocity of the spacecraft about its roll axis; rate gyro 12 is placed on the spacecraft to produce signals proportional to the angular velocity of the spacecraft about its pitch axis; and rate gyro 13 is placed on the spacecraft to produce signals proportional to the angular velocity of the spacecraft about its yaw axis. A horizon scanner 14 is placed on the spacecraft to produce signals proportional to the angular position of the spacecraft about its roll axis; a horizon scanner 15 is placed on the spacecraft to produce signals proportional to the angular position of the spacecraft about its pitch axis; and a horizon scanner 16 is placed on the spacecraft to produce signals proportional to the angular position of the spacecraft about its yaw axis. The output of rate gyro 11 is applied through an amplifier 17 to an adder 23; the output of horizon scanner 14 is applied through an amplifier 18 to adder 23; the output of rate gyro 12 is applied through an amplifier 19 to an adder 24; the output of horizon scanner 15 is applied through an amplifier 20 to adder 24. The output of rate gyro 13 is applied through an amplifier 21 to an adder 25; and the output of horizon scanner 16 is applied through an amplifier 22 to adder 25. Amplifiers 17–22, in addition to amplifying, multiply the inputs applied to them by different constants so that the inputs are weighted in and desired manner. Alternatively, the adders 23, 24 and 25, by means of different sized input resistors, could weight the inputs. The outputs of adders 23, 24 and 25 are applied to the dual twin control moment gyro system 26. The details of moment gyro system 26 will be disclosed in detail later in this specification. Rate gyros, horizon scanners and adders are well known and therefore will not be disclosed in detail in this specification. It should be noted that even though horizon scanners have been used to produce signals proportional to angular position, other devices such as sun sensors and stable platforms could be used.

Figure 2:
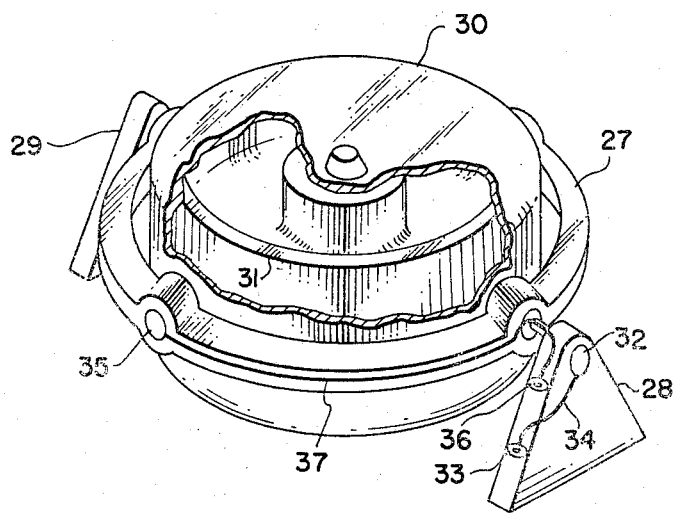
FIG. 2 is a perspective drawing of a control moment gyro.

Referring now to FIG. 2, there is shown a drawing of a control moment gyro. Four of these control moment gyros are used by this invention. The control moment gyro shown consists of an outer gimbal 27 rotatably mounted on supports 28 and 29 so that gimbal 27 can rotate relative to the spacecraft. Rotatably mounted inside outer gimbal 27 is an inner gimbal 30; and rotatably mounted inside inner gimbal 30 is a flywheel 31. Mechanically connected to outer gimbal 27 and mounted on support 28 is a torquer 32 which applies a torque to gimbal 27 proportional to the signal applied to it. This signal is applied to torquer 32 through a terminal 33 and an electrical lead 34. Mechanically connected to inner gimbal 30 and mounted on outer gimbal 27 is another torquer 35 which applies a torque to gimbal 30 proportional to the signal applied to it. This signal is applied to torquer 35 through a terminal 36 and an electrical lead 37. The flywheel 31 is rotated at a constant speed by a constant speed motor not shown in the drawing.

Figure 3:
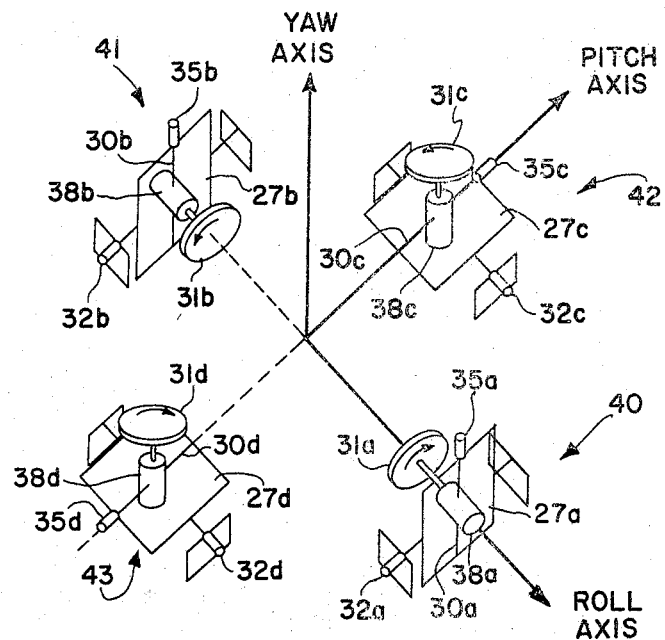
FIG. 3 is a schematic drawing of the dual twin control moment gyro shown in FIG. 1.

Turning now to FIG. 3, there is shown a schematic diagram of the dual twin control gyro system 26 in FIG. 1. This dual twin moment gyro system consists of four of the control moment gyros described in FIG. 2. Two of these control moment gyros, 40 and 41, are alined with the roll axis; and two of them, 42 and 43, are alined with the yaw axis of the spacecraft. The flywheels $31a$ and $31b$ of control moment gyros 40 and 41 are initially alined with the roll axis of the spacecraft. These flywheels rotate in opposite directions such that their angular momenta about the roll axis are equal but opposite. Therefore, the torques about the yaw and pitch axes caused by these momenta cancel. Control moment gyros 42 and 43 are alined with the yaw axis of the spacecraft. The flywheels $31c$ and $31d$ of control moment gyros 42 and 43 are initially alined with the yaw axis of the spacecraft. Flywheels $31c$ and $31d$ have angular momenta about the yaw axis that are equal but opposite. Therefore, the torques about the pitch and roll axes caused by these momenta cancel. The output from adder 23 in FIG. 1 is applied to torquers $32c$ and $32d$; the output from adder 24 is applied to torquers $32a$, $32b$, $35c$, and $35d$; and the output from adder 25 is applied to torquers $35a$ and $35b$. In this way flywheels $31a$, $31b$, $31c$, and $31d$ all precess in synchronism when inputs are applied to all the torquers. Motors $38a$, $38b$, $38c$, and $38d$ are constant-speed motors used for the purpose of imparting equal angular momenta to the flywheels.

Figure 4:
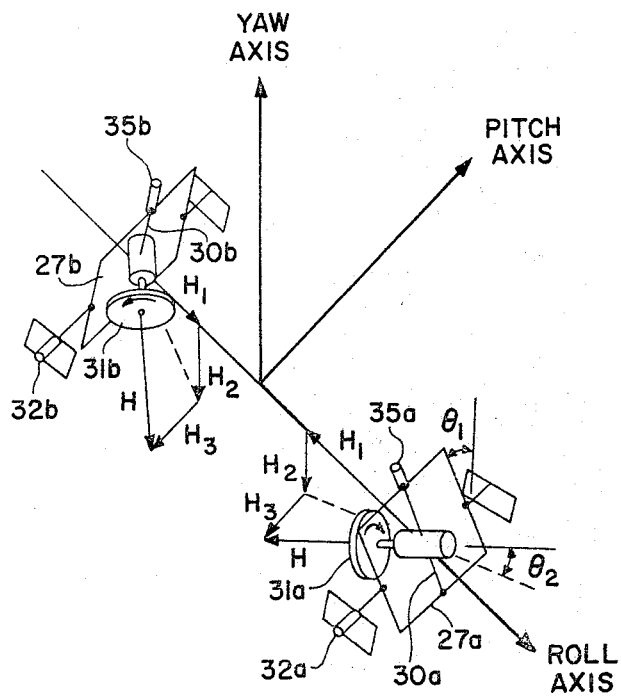
FIG. 4 is a schematic drawing of a twin control moment gyro for the purpose of explaining its operation.

It will now be explained how the moment control gyros control the spacecraft. The control torques are produced by the precession of the flywheels about the double gimbals. This precession in induced about either gimbal by the application of a torque about the other gimbal. FIG. 4 shows these gimbal precessions for the twin control moment gyro alined with the roll axis. The angle $\theta_1$ between outer gimbals $27a$ and $27b$ and the yaw axis is produced by torques applied to the inner gimbals $30a$ and $30b$ by torquers $35a$ and $35b$. and the angle $\theta_2$ between inner gimbals $30a$ and $30b$ and the roll-yaw plane is the result of torques applied to outer gimbals $27a$ and $27b$ by torquers $32a$ and $32b$. As shown in FIG. 4, in this position, each of the flywheels $31a$ and $31b$ produces a change in angular momentum which applies a torque, derived from the rotation of the angular momentum vector H, to the spacecraft. Vector H is a vector sum of the momenta $H_1$, $H_2$, and $H_3$ along the roll, yaw and pitch axes and remains constant. As can be seen, the vectors $H_1$ along the roll axis for this particular twin moment gyro are equal but opposite thereby cancelling each other. The time rates of change of the vectors $H_2$ represent the torques applied to the spacecraft about the yaw axis by the flywheels. Since these vector changes are in the same direction, they do not cancel but add to produce a torque about the yaw axis equal to $2dH_2/dt$. The changes in vectors $H_3$ also add to produce a torque about the pitch axis equal to $2dH_3/dt$. As can readily be seen, by applying torques to the outer and inner gimbals of the twin control moment gyro, control torques can be applied about the pitch and yaw axes. By the same line of reasoning, the twin moment control gyro alined with the yaw axis applies torques about the pitch and the roll axes.

The operation of the invention for the nonspinning mode of operation of the spacecraft will now be described while referring to FIGS. 1 and 3. When unwanted motions occur in the spacecraft, rate gyros 11, 12 and 13 produce signals that are proportional to the angular velocities of the spacecraft about its yaw, roll and pitch axes; and horizon scanners 14, 15 and 16 produce signals that are proportional to the angular positions of the spacecraft about its yaw, roll and pitch axes. These signals are amplified and weighted in any desired manner by amplifiers 17–22. The signals from amplifiers 17 and 18 are added by adder 23, the signals from amplifiers 19 and 20 are added by adder 24, and the signals from amplifiers 21 and 22 are added by adder 25. The resulting signal from adder 23 is applied to torquers $32c$ and $32d$ to produce torques or gimbal rates which cause flywheels $31c$ and $31d$ to precess about gimbals $30c$ and $30d$. The signal output from adder 24 is applied to torquers $35c$, $35d$, $32a$ and $32b$ to produce torques or gimbal rates which cause flywheels $31a$, $31b$, $31c$ and $31d$ to precess about gimbals $27c$, $27d$, $30a$ and $30b$. The signal output from adder 25 is applied to torquers $35a$ and $35b$ to produce torques or gimbal rates which cause flywheels $31a$ and $31b$ to precess about gimbals $27a$ and $27b$. The resulting precessions of the flywheels create torques about the pitch, roll and yaw axes which tend to correct or cancel out the undesired or unwanted motion of the spacecraft. The disclosure of this invention thus far has related to damping out or correcting undesired movements of the spacecraft. However, it should be noted that this invention can also be used to guide a spacecraft. This can be done by generating signals independent of the motion of the spacecraft and applying them to the amplifiers shown in FIG. 1. In other words, by generating signals independent of the motion of the spacecraft and applying them through the amplifiers and adders to the dual control moment gyro system 26, the spacecraft can be guided in accordance with the generated signals.

Figure 5:
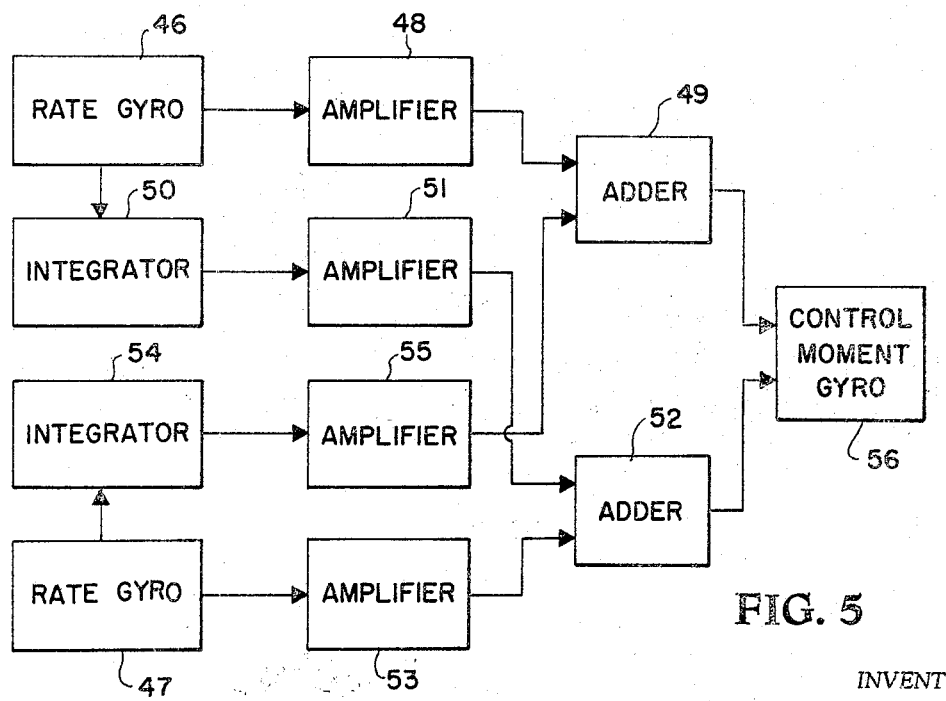
FIG. 5 is a block diagram of the invention for the spinning mode of operation of the spacecraft.

FIG. 5 is a block diagram of this invention for the spinning mode of operation of the controlled spacecraft. Two rate gyros 46, and 47 are placed on the spacecraft to produce signals proportional to the angular velocities of the spacecraft about two axes perpendicular to the spin axis of the spacecraft. The output from rate gyro 46 is applied through an amplifier 48 to an adder 49. The output of rate gyro 46 is also integrated by an integrator 50, amplified by an amplifier 51 and then applied to an adder 52. The output from rate gyro 47 is applied through an amplifier 53 to adder 52. The output of rate gyro 47 is also integrated by an integrator 54, amplified by an amplifier 55 and then applied to adder 49. The amplifiers 48, 51, 53, and 55 are weighted just as the amplifiers in FIG. 1 are weighted. The outputs from adders 49 and 52 are applied to a control moment gyro 56. Control moment gyro 56 is the same as the control moment gyro shown in FIG. 2. The output from adder 49 is applied to torquer 32 and the output from adder 52 is applied to torquer 35. The flywheel 31 is initially alined with the spin axis; consequently, when torques are applied to outer gimbal 27 and inner gimbal 30 by torquers 32 and 35 the flywheel 31 precesses and while misalined produces controlling torques about the axes of the spacecraft perpendicular to the spin axis, thereby damping out any unwanted movement of the spacecraft.

The advantages of this invention are numerous. The invention represents a successful effort to provide an optimum fine attitude control system for spacecraft. The system uses momentum devices to produce torques that can be applied to any desired direction without unwanted cross-coupling effects and thus allows maximum use of the available angular momentum for control. The number of momentum devices are held to four, thereby minimizing the power consumption and weight of the system. The system can provide the fine pointing accuracies that may be required for experimental and photographic missions in a spacecraft. It has an inherent advantage in that failure of any one of the momentum devices will not make the system inoperative. It will continue to operate, but at a reduced efficiency. The control command inputs to the system consist of direct gimbal torques or rate commands which are easy to mechanize. Because of this inherent simplicity, the system can be contrrolled both manually and automatically.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. A fine attitude control and damping system for a nonspinning spacecraft comprising: a first flywheel mounted on a first double gimbal; a second flywheel mounted on a second double gimbal; a third flywheel mounted on third double gimbal; a fourth flywheel mounted on a fourth double gimbal; means for imparting equal but opposite angular momenta to said first and second flywheels; means for imparting equal but opposite momenta to said third and fourth flywheels; said first and second double gimbals located on a first axis of said spacecraft and in synchronized initial positions such that said first and second flywheels produce angular moments about said first axis that cancel and do not produce any torque about a seocnd axis and a third axis; said third and fourth double gimbals located on said third axis of said spacecraft and in synchronized initial positions such that said third and fourth flywheels produce angular momenta about said third axis that cancel and do not produce any torque about said first and second axes; means for applying torques to said first and second double gimbals to cause said first and second flywheels to precess in synchronisms and apply torques about said second and third axes; and means for applying torques to said third and fourth double gimbals to cause said third and fourth flywheels to precess in synchronism and apply torques about said first and second axes whereby the attitude of said spacecraft can be controlled about each of said three axes.

2. A fine attitude control and damping system in accordance with claim 1 wherein said means for applying torques to said first, second, third and fourth double gimbals includes means for applying torques to these double gimbals that are related to the unwanted motions of the spacecraft about its first, second and third axes, whereby these unwanted motions are damped out.

3. A fine attitude control and damping system in accordance with claim 1 wherein each of said first, second, third, and fourth double gimbals consists of an inner gimbal and an outer gimbal with the corresponding flywheel mounted inside said inner gimbal.

4. A fine attitude control and damping system in accordance with claim 3 wherein said means for applying torque to said first, second, third and fourth double gimbals includes means for applying a first set of equal synchronized torques to two of the gimbals of said first, second, third and fourth double gimbals, means for applying a second set of equal synchronized torques to two other gimbals of said first, second, third and fourth double gimbals, and means for applying a third set of equal synchronized torques to the other four gimbals of said first, second, third, and fourth double gimbals.

5. A fine attitude control and damping system for a spacecraft having a spinning mode of operation comprising: an outer gimbal alined with a first axis perpendicular to the spin axis of said spacecraft; an inner gimbal mounted in said outer gimbal and initially alined with a second axis perpendicular to said first axis and said spacecraft spin axis; a flywheel mounted in said inner gimbal with its initial spin axis alined with said spacecraft spin axis; means for applying a torque to said outer gimbal that is related to unwanted motion of said spacecraft about said first axis; and means for applying a torque to said inner gimbal that is related to the unwanted motion of said spacecraft about said second axis whereby the resulting precession of said flywheel applies torques to said spacecraft that tend to damp out said unwanted motions.

6. A fine attitude control and damping system for a nonspinning spacecraft comprising: first and second double gimbals with each consisting of an outer gimbal and an inner gimbal; a first flywheel mounted for rotation inside the inner gimbal of said first double gimbal and a second flywheel mounted for rotation inside the inner gimbal of said second double gimbal; means for imparting equal but opposite angular momenta to said first and second flywheels; said first and second double gimbals located on a first axis of said spacecraft and in synchronized initial positions such that said first and second flywheels produce angular moments about said first axis that cancel and do not produce any torque about the two axes perpendicular to said first axis; and means for applying synchronized torques to the outer gimbals of said first and second double gimbals and for applying synchronized torques to the inner gimbals of said first and second double gimbals to cause said first and second flywheels to precess in synchronism, whereby said precessions cause reaction torques to be produced about said two perpendicular axes to control the attitude of said spacecraft.

References Cited

UNITED STATES PATENTS 3,004,437  10/1961  Pittman _____ 174—5.34
3,158,340  11/1964  Sellers _____ 244—79

MILTON BUCHLER, *Primary Examiner.*

B. BELKIN, *Assistant Examiner.*